United States Patent
Bajic et al.

(10) Patent No.: US 11,709,662 B2
(45) Date of Patent: Jul. 25, 2023

(54) SPARSITY UNIFORMITY ENFORCEMENT FOR MULTICORE PROCESSOR

(71) Applicant: Tenstorrent Inc., Toronto (CA)

(72) Inventors: Ljubisa Bajic, Toronto (CA); Davor Capalija, Toronto (CA); Yu Ting Chen, Toronto (CA); Andrew Grebenisan, Oshawa (CA); Hassan Farooq, Courtice (CA); Akhmed Rakhmati, Ajax (CA); Stephen Chin, Toronto (CA); Vladimir Blagojevic, Banjaluka (BA); Almeet Bhullar, Brampton (CA); Jasmina Vasiljevic, Toronto (CA)

(73) Assignee: Tenstorrent Inc., Toronto (CA)

( * ) Notice: Subject to any disclaimer, the term of this patent is extended or adjusted under 35 U.S.C. 154(b) by 42 days.

(21) Appl. No.: 17/519,947

(22) Filed: Nov. 5, 2021

(65) Prior Publication Data

US 2023/0146541 A1 May 11, 2023

(51) Int. Cl.
*G06F 9/38* (2018.01)
*G06N 3/04* (2023.01)
*G06F 8/41* (2018.01)

(52) U.S. Cl.
CPC ............ *G06F 9/3838* (2013.01); *G06F 8/443* (2013.01); *G06F 8/451* (2013.01); *G06F 8/453* (2013.01); *G06N 3/04* (2013.01)

(58) Field of Classification Search
CPC G06N 3/04; G06F 8/453; G06F 8/451; G06F 8/443; G06F 9/3838
See application file for complete search history.

(56) References Cited

U.S. PATENT DOCUMENTS

| | | | |
|---|---|---|---|
| 9,977,663 B2* | 5/2018 | Rong | G06F 8/452 |
| 10,186,011 B2 | 1/2019 | Nurvitadhi et al. | |
| 10,482,156 B2 | 11/2019 | Diril et al. | |
| 2012/0167069 A1* | 6/2012 | Lin | G06F 8/456 |
| | | | 717/160 |
| 2017/0364517 A1* | 12/2017 | Kafai | G06F 17/10 |

(Continued)

OTHER PUBLICATIONS

MM Baskaran, "Optimizing Sparse Matrix-Vector Multiplication on GPUs Using Compile-time and Run-time Strategies" (Year: 2008).*

(Continued)

*Primary Examiner* — Phillip H Nguyen
(74) *Attorney, Agent, or Firm* — Daylight Law, P.C.

(57) ABSTRACT

Methods and systems relating to the field of parallel computing are disclosed herein. The methods and systems disclosed include approaches for sparsity uniformity enforcement for a set of computational nodes which are used to execute a complex computation. A disclosed method includes determining a sparsity distribution in a set of operand data, and generating, using a compiler, a set of instructions for executing, using the set of operand data and a set of processing cores, a complex computation. Alternatively, the method includes altering the operand data. The method also includes distributing the set of operand data to the set of processing cores for use in executing the complex computation in accordance with the set of instructions. Either the altering is conducted to, or the compiler is programmed to, balance the sparsity distribution among the set of processing cores.

20 Claims, 5 Drawing Sheets

(56) References Cited

U.S. PATENT DOCUMENTS

| | | | |
|---|---|---|---|
| 2018/0004496 A1* | 1/2018 | Rong | G06F 8/447 |
| 2019/0138896 A1 | 5/2019 | Deng | |
| 2019/0340511 A1 | 11/2019 | Yous et al. | |
| 2021/0319317 A1* | 10/2021 | Power | G06N 3/063 |

OTHER PUBLICATIONS

MM Baskaran, "Optimizing Sparse Matrix-Vector Multiplication on GPUs" (Year: 2009).*

Im et al., "Optimizing Sparse Matrix Computations for Register Reuse in SPARSITY" (Year: 2001).*

Kotlyar et al., "A Relational Approach to the Compilation of Sparse Matrix Programs" (Year: 1997).*

Vishist Sharma, "Sparse-Matrix support for the SkePU library for portable CPU/GPU programming" (Year: 2016).*

Dastgeer et al., "Conditional component composition for GPU-based systems" (Year: 2014).*

Han et al., "EIE: Efficient Inference Engine on Compressed Deep Neural Network", 2016 ACM/IEEE 43rd Annual International Symposium on Computer Architecture, pp. 243-254.

Extended European search report from EP Application No. 22205146.8, dated Mar. 29, 2023, 12 pages.

M. Baskaran et al. "Low-overhead load-balanced scheduling for sparse tensor computations". 2014 IEEE High Performance Extreme Computing Conference (HPEC), Waltham, MA, USA, 2014, pp. 1-6, doi: 10.1109/HPEC.2014.7041006.

R. Senanayake et al. "A sparse iteration space transformation framework for sparse tensor algebra". Proceedings of the ACM on Programming Languages, vol. 4, Issue OOPSLA, Article No. 158, pp. 1-30, (Nov. 2020). https://doi.org/10.1145/3428226.

Z. Yao et al. 2019. "Balanced sparsity for efficient DNN inference on GPU". In Proceedings of the Thirty-Third AAAI Conference on Artificial Intelligence and Thirty-First Innovative Applications of Artificial Intelligence Conference and Ninth AAAI Symposium on Educational Advances in Artificial Intelligence (AAAI'19/IAAI'19/EAAI'19). AAAI Press, Article 696, 5676-5683. https://doi.org/10.1609/aaai.v33i01.33015676.

M. Zhu et al. "Taming Unstructured Sparsity on GPUs via Latency-Aware Optimization". 2020 57th ACM/IEEE Design Automation Conference (DAC), 1-6. (2020).

M. Mohammadi et al. "Sparse computation data dependence simplification for efficient compiler-generated inspectors" Proceedings of the 40th ACM SIGPLAN Conference on Programming Language Design and Implementation. (2019).

Notice of allowance and fee due from U.S. Appl. No. 17/520,084 dated Apr. 27, 2023, 10 pages.

* cited by examiner

SPARSITY UNIFORMITY ENFORCEMENT FOR MULTICORE PROCESSOR

BACKGROUND

Machine intelligence systems represent one of the most computationally complex and energy intensive computation applications of the modern age. As artificial neural networks (ANNs) represent the bulk of current machine intelligence systems in use today, a significant amount of research and development has been invested in ways to make the execution of ANNs less energy intensive. ANNs take in an input tensor, conduct calculations using the input tensor and a set of network tensors, and produce an output tensor. The output tensor represents an inference generated by the network in response to the input. For example, if the ANN were an image classifier, the input could be an encoding of an image of a cat, and the output vector could be an inference indicating that the subject of the image was a cat. The reason these systems are so resource hungry is that the data structures they are operating on are generally very large, and the number of discrete primitive computations that must be executed on each of the data structures is likewise immense.

Machine intelligence systems represent a challenging environment both in terms of the number of computations that are required and the large data structures that must be moved between memory and the computation area of the system for those computations to be executed. The massive flows of data between longer term memory and the execution area of the system is a critical design challenge for machine intelligence systems. The network data for a standard ANN can often comprise billions of discrete data entries. The network data can comprise weight vectors, filter vectors, and various other kinds of data based on the type of ANN. The network data is usually organized into layers with the output of each layer serving as the input to the next layer. In a traditional ANN, the layers are fully connected, which requires every element of the input vector to be involved in a calculation with every element of the weight vector. The resulting number of calculations involved is very large. Furthermore, the input data to the ANN, the network data for the ANN, and the execution data that is generated through the execution of one layer of the ANN to serve as inputs for the next layer of the ANN all need to be held in memory until they are used for computations in the next layer.

A developing area of research in the field of machine intelligence and computer science are ways in which the number of computations required for the execution of a given ANN can be reduced while still maintaining fidelity to the performance of the ANN with the number of computations fixed. Approaches in this field include those in which specific computations in the execution of an ANN are skipped at the time of execution based on various factors. Additional approaches involve modifying the ANN prior to execution by pruning out network data that is not necessary for the execution of the network. These approaches are often referred to with terms such as "drop out" and "pruning" and are done during the initial training phase of the ANN as the appropriate network data for a given network is being learned.

SUMMARY

Methods and systems related to the field of parallel computing are disclosed herein. The methods and systems disclosed include approaches for sparsity uniformity enforcement for a set of computational nodes which are used to execute a complex computation. The approaches include those in which the sparsity of the operand data for a complex computation is either measured or increased by altering the operand data of the complex computation. The approaches include those in which the set of computational nodes is configured to balance a sparsity distribution of the operand data among the computational nodes of the set of computational nodes. As the presence of sparsity in the operand data of a complex computation can lead to a reduction in the computation resources required for such complex computation, the enforcement of a uniform degree of sparsity across a set of computational nodes during the parallel execution of such complex computation by such computational nodes can improve the parallelization performance of the set of computational nodes.

Specific embodiments of the invention disclosed herein are described with reference to balancing a sparsity distribution of a set of operand data among the computational nodes of a system. Sparsity, when used with reference to a set of data, refers to the quality of having a small number of dispositive (sparse) values among a much larger set of unimportant (non-sparse) values. For example, in a matrix multiplication operation between two matrixes with a majority of zero values, the non-zero values are sparse values, and the zero values are non-sparse values. In specific classes of complex computations, such as the execution of a standard ANN, many of the component computations can be skipped as the data structures involved are sparse and the sparse values have a higher impact on the outcome of the computation as compared to the non-sparse values. As such, balancing a distribution of sparsity to the various computational nodes will, in specific applications, result in a more even distribution of computations that can skipped. This in turn will improve the parallelization performance of the set of computational nodes as component computations are dispatched in a manner that favors an equal workload for each of the computational nodes to execute in parallel.

In specific embodiments of the invention, a computer-implemented method is provided. The method comprises determining a sparsity distribution in a set of operand data, generating, using a compiler, a set of instructions for executing, using the set of operand data and a set of processing cores, a complex computation, and distributing the set of operand data to the set of processing cores for use in executing the complex computation in accordance with the set of instructions. The compiler is programmed to utilize the sparsity distribution in the set of operand data, when generating the set of instructions, to balance the sparsity distribution among the set of processing cores.

In specific embodiments of the invention, a system is provided. The system comprises a set of processing cores, a compiler programmed to: (i) determine a sparsity distribution of a set of operand data; and (ii) generate a set of instructions for executing a complex computation using the set of operand data and the set of processing cores, and a network programmed to distribute the set of operand data to the set of processing cores for use in executing the complex computation in accordance with the set of instructions. The compiler is further programmed to utilize the sparsity distribution in the set of operand data, when generating the set of instructions, to balance the sparsity distribution among the set of processing cores.

In specific embodiments of the invention, a system is provided. The system comprises a means for determining a sparsity distribution in a set of operand data, a means for generating a set of instructions for executing a complex computation using the set of operand data and a set of processing cores, and a means for distributing the set of operand data to the set of processing cores for use in executing the complex computation in accordance with the set of instructions. The means for generating utilizes the sparsity distribution in the set of operand data, when generating the set of instructions, to balance the sparsity distribution among the set of processing cores.

In specific embodiments of the invention, a computer-implemented method is provided. The method comprises altering a set of operand data to increase a degree of sparsity in a sparsity distribution of the set of operand data, wherein the set of operand data is for a complex computation and distributing the set of operand data to a set of processing cores for executing the complex computation. The altering balances the sparsity distribution among the set of processing cores.

In specific embodiments of the invention, a system is provided. The system comprises a set of processing cores, and at least one controller programmed to alter a set of operand data to increase a degree of sparsity in a sparsity distribution of the set of operand data. The set of operand data is for a complex computation. The system comprises a network programmed to distribute the set of operand data to the set of processing cores for use in executing the complex computation. The altering balances the sparsity distribution among the set of processing cores.

In specific embodiments of the invention, a system is provided. The system comprises a set of processing cores and a means for altering a set of operand data to increase a degree of sparsity in a sparsity distribution of the set of operand data. The set of operand data is for a complex computation. The system also comprises a means for distributing the set of operand data to a set of processing cores for executing the complex computation. The means for altering balances the sparsity distribution among the set of processing cores.

DETAILED DESCRIPTION

Figure 1:
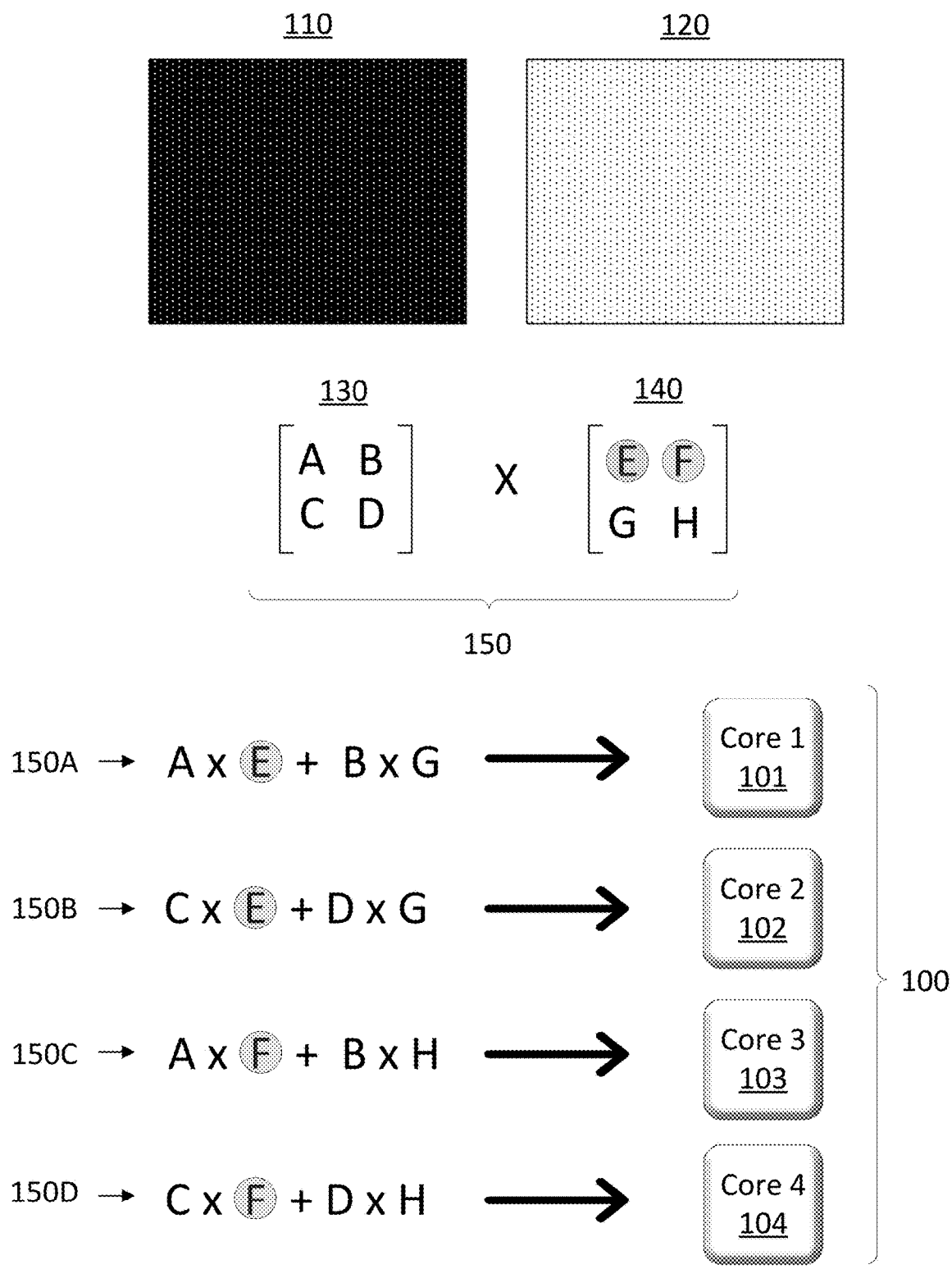
FIG. 1 illustrates a conceptual flow diagram of distributing a set of operand data, with a sparsity distribution, in a manner which balance the sparsity distribution among the computational nodes in accordance with specific embodiments of the invention disclosed herein.

Methods and systems related to the field of parallel computing in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Specific embodiments of the invention disclosed herein are described with reference to a set of processing cores in a multicore processor executing a complex computation in parallel. The processing cores of a multicore processor can cooperatively execute complex computations by executing component computations of that complex computations in distributed fashion across the processing cores. To do so, the processing cores need to share data required for the execution of those component computations as well as receive instructions regarding which component computations they have been assigned. The processing cores can share this information using an interconnect fabric such as a network-on-Chip (NoC). The same network can be used to load the individual processing cores with their instructions and to provide them with the initial data to execute the computation. A multicore processor, including the various processing cores and the interconnect fabric which connects them, provides a basis for explaining various embodiments of the invention disclosed herein. However, while the example of a set of cores of a multicore processor is used as an example throughout this disclosure, specific embodiments of the invention disclosed herein are more broadly applicable to any set of computational nodes connected using any form of interconnect fabric or network.

Specific embodiments of the invention disclosed herein are described with reference to a complex computation in the form of an execution of a directed graph. In particular, the directed graph could be an ANN such as a convolutional neural network (CNN), a residual neural network (ResNet), recursive neural network (RNN), attention network, embedding, or any form of ANN. As such, the complex computation can involve the generation of an inference from the ANN in response to a given input. The execution can occur during a training phase of the ANN or after the network has been trained and deployed. The computation data in these embodiments includes the input data to the ANN, the execution data (e.g., activation data that is passed from one layer of the network to the next), the network data (e.g., weight or filter data) that defines the network, and the output data which is ultimately produced from the execution of the ANN. As used in this disclosure the term "operand data," when used to refer to the operands in the instructions used to execute an ANN, includes the network data, the input data, the execution data, and the output data of the network. ANNs provide a basis for explaining various embodiments of the invention disclosed herein. However, specific embodiments of the invention disclosed herein are more broadly applicable to any complex computation including those used in association with graphics renderings, cryptographic algorithms, and big data computations generally.

FIG. 1 illustrates a conceptual flow diagram of distributing a set of operand data, with a sparsity distribution, in a manner which balance the sparsity distribution among the computational nodes in accordance with specific embodiments of the invention disclosed herein. FIG. 1 includes representations of a non-sparse data structure 110 and a sparse data structure 120. Non-sparse data structure 110 can be a data structure with a lower degree of sparsity (contains more non-sparse values). Sparse data structure 120 can be a data structure with a higher degree of sparsity (contains more sparse values).

FIG. 1 also illustrates an example of a complex computation 150 in the form of a matrix multiplication. The example of complex computation 150 is for explicative purposes only. It is to be understood that complex computations can include any kind of computations involving any number of operands and operations. Complex computation 150 includes the multiplication of matrix 130 and matrix 140. Matrices 130 and 140 include data values A, B, C, D, E, F, G, and H, and represent, in this example, the operand data of the complex computation. Data values A, B, C, D, E, F, G, and H can be individual data values or blocks of data values. Matrix 130 can include data values from data structure 110, while matrix 140 can include data values from data structure 120. In this example, circled data values represent sparse values, while non-circled data values represent non-sparse data values. As illustrated, matrix 130 does not comprise any sparse value, while matrix 140 comprises some sparse values (represented by two sparse data values E and F). Matrices 130 and 140 constitute therefore a representation of the sparsity in data structures 110 and 120, respectively.

Complex computation 150 can include multiple component computations, which in turn can be distributed among a set of processing cores in order to parallelize the execution of such component computations and improve the overall efficiency of the execution of the complex computation. In the example of FIG. 1, complex computation 150 can include component computations 150A, 150B, 150C, and 150D, each of which represents a portion of the computation necessary to execute complex computation 150 (i.e., to multiply matrices 130 and 140). Component computations 150A-D can then be distributed to a set of computational nodes, such as a network of processing cores 100, which includes, in this non-limiting example, cores 101, 102, 103 and 104. The network of processing cores can include any number of processing cores and it is not limited to the exemplary configurations used for explicative purposes in this disclosure.

The data values from matrices 130 and 140 are then used as operands for component computations 150A-D. Because each component computations resolves only a portion of the complex computation, they use different data values from the original sets of data values in matrices 130 and 140. In this way, the data values in the original data set are distributed among the processing cores, including the sparse data values (E and F). In the example of FIG. 1, because each processing core receives an even number of sparse values, it can be said that there is a balance in the distribution of sparsity. The matrix multiplication 150 in the example of FIG. 1 can be an application-code level "operation" while the individual component computations (e.g., component computation 150A) can be instructions for execution by a processing core to implement the matrix multiplication. The "operation" 150 can be translated into the "instructions" 150A-B by a dedicated module of the system, such as compiler, as will be described in more detail in this disclosure.

As used herein the term "balance a distribution" of the sparsity refers to a flatting of a distribution of the sparsity, but does not necessarily refer to a perfectly even distribution, because optimizing solely for a perfectly even distribution would likely significantly disadvantage the overall performance of the device and may not be possible based on the fact that operand data is generally distributed in subsets of greater than one data value.

In accordance with the definition above, the distribution of component computations 150A-D in the example of FIG. 1 is flattened in that each processing core received an amount of sparse data values as operands that is not disproportionate to the number of sparse values received by other cores in the network (e.g., all the cores received at least one sparse data value). This flattened distribution of sparsity is due to several reasons in this example. First, the natural distribution of sparse values in the original data sets in matrices 130 and 140 is convenient to the complex computation being executed. Second, the component computations for the complex computation to be executed (multiplication of such matrices) uses the sparsity in an advantageous way in that each component computation involves at least one sparse value. Third, the distribution of components computations into the different processing cores (component computation 150A goes to core 101; component computation 150B goes to core 102; component computation 150C goes to core 103; component computation 150D goes to core 104) ensures that each processing core receives operand data which includes an even amount of sparsity. In this way, the sparsity distribution of the data sets to be operated on, the distribution of processing cores in the network of processing cores, and the distribution of component computations (and operands/data values involved in such component computations) to such processing cores, among other factors, can have an impact on balancing a distribution of sparsity among the processing cores.

Balancing a distribution of sparsity in a set of operand data across a set of computational nodes can be conducted by first determining a distribution of the sparsity. The determining of the distribution of the sparsity can be achieved by analyzing the operand data or by altering the operand data. In specific approaches, the determining of the distribution of the sparsity can be achieved by analyzing the operand data and altering the operand data in combination. Approaches in which a degree of sparsity of a set of operand data is increased can be particularly advantageous in that not only the parallelization of the system is improved but also the overall total number of computations that must be executed can be reduced or simplified.

In specific embodiments of the invention, a sparsity distribution of a set of operand data can be determined by analyzing the operand data. For example, the values of the set of operand data can be inspected by the system to determine which entries in the set of operand data are non-sparse. The inspection can include an evaluation of every entry in the set of operand data or a statistical sampling of a subset of entries. As another example, metadata stored in association with the values can be inspected by the system to glean an understanding of the distribution of sparsity across the set of operand data. The metadata can be generated from a prior analysis of the operand data when the operand data was readily available for inspection by, for example, a specialized hardware circuit connected to the output of a processing pipeline which produced the data through a computation.

In specific embodiments of the invention, a sparsity distribution of a set of operand data can be determined by altering the operand data. For example, a system could alter the operand data by setting specific values to non-sparse values. The system could alter the data values without conducting any analysis of the operand data. For example, the system could force specific data values in a set of operand data to non-sparse values without knowing if the specific data values were already non-sparse or what their sparse value was. The distribution of sparsity formed by this action can then be balanced across a set of computational nodes. Notably, the distribution of sparsity of a set of operand data formed by this action is not the same thing as a distribution of sparsity of the set of operand data in its entirety because the data values of the entries in the set of operand data that were not set to a non-sparse value are unknown. However, benefits can still accrue to these approaches if the number of altered data values are appreciable compared to the total size of the set of operand data (e.g., if one in every ten or fewer data entries are altered to a non-sparse value).

In specific embodiments of the invention, determining the sparsity distribution of a set of operand data includes both analyzing and altering the data values of the set of operand data. For example, the system could both alter specific values to non-sparse values and inspect other values which were not altered to obtain a complete understanding of the distribution of sparsity in the operand data overall. In still further alternative approaches, the system can analyze values and let the analysis guide which values to alter. For example, the system could analyze all values and round values below a set threshold to a non-sparse value. In these examples, the system would build up a complete picture of the distribution of sparsity in the system while at the same time increasing the sparsity of the data structure which could lead to significant performance improvements.

In specific embodiments of the invention, a sparsity distribution of a data set can be determined at different times relative to the time at which the data set will be used for a complex computation. The sparsity distribution can be determined ex ante during a setup phase, such as the compilation of instructions for the execution of the complex computation, during the execution of the complex computation itself for use during the same execution, or after the execution of the complex computation for later use in a different execution using the same data set. In the specific context of an ANN, a sparsity distribution of the network data for the execution of the ANN can be determined during the compilation of instructions for the execution of the ANN by inspecting the values in memory. Alternatively, the sparsity distribution of the network data can be determined during the execution of the ANN as the data is pulled from memory and utilized in a computation. In keeping with the same context, a sparsity distribution of the execution data for the same execution of the ANN can be determined while the computation is being conducted. These examples can be used in combination or in isolation. For example, the distribution of sparsity for the network data of an ANN can be determined during compilation while the distribution of sparsity for the execution data can be determined during execution of the complex computation.

In specific embodiments of the invention, the sparsity distribution can be determined by different systems. The sparsity distribution can be determined by firmware, software, or hardware in the system. The sparsity distribution can be determined by a compiler generating instructions for the execution of the complex computation. The sparsity distribution can be determined by a compiler with access to the stored data or metadata concerning the stored data that is obtained by hardware or firmware of the computational nodes and stored in association with the operand data. The metadata can be stored in the same data structures as the operand data, such as in the header of data tiles or blocks which hold the operand data, or it can be stored in a separate data structure. The sparsity distribution can be determined by firmware or hardware that operates upon the operand data as it is generated by the execution areas of the computational nodes (in the case of execution data of an ANN). The sparsity distribution can be determined by network components of the system such as in routers or network interface units of the network as the data is transmitted between computational nodes or to computational nodes from an external source (e.g., in the case of network, execution, or input data of an ANN). The sparsity distribution can also be determined by a software program or firmware in a memory access system as the data is pulled from a slower external memory and loaded into the computational nodes prior to execution of the complex computation (e.g., in the case of network data of an ANN). Hardware in the form of data inspection logic circuits can also be interjected into the flow of data in the system in any of the previously mentioned locations to inspect the data and memorialize data representative of the degree of sparsity. For example, a logic circuit could be designed to inspect a data block for sparsity and write a code to a header of the data block or another data structure in relation to the data block based on the results of the inspection. A relationship between codes and levels of sparsity could be hard coded into the logic circuit.

Figure 2:
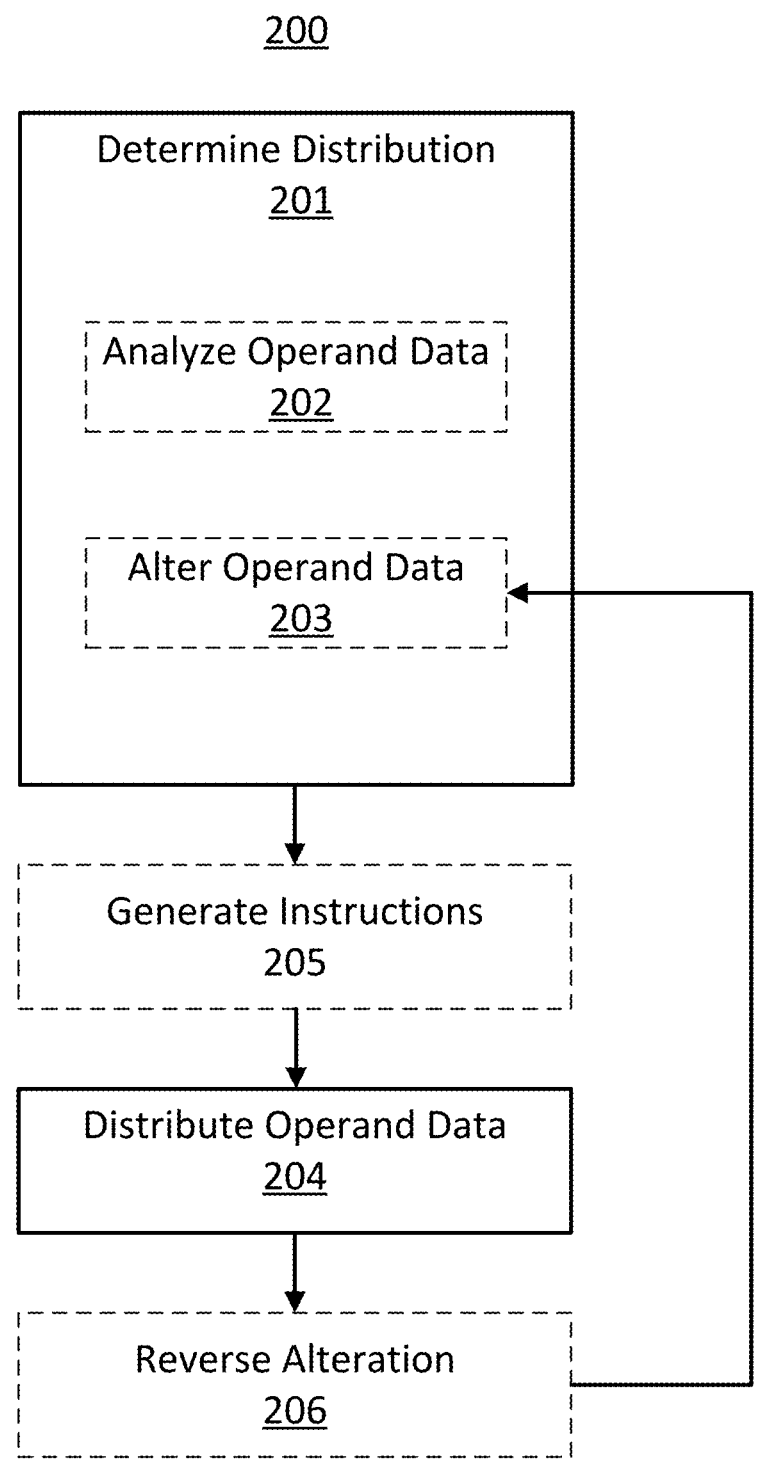
FIG. 2 illustrates a flow chart for a set of methods in accordance with specific embodiments of the invention disclosed herein.

FIG. 2 illustrates a flow chart 200 for a set of methods in accordance with specific embodiments of the invention disclosed herein. The methods in flow chart 200 can be computer implemented and be executed by one or more processors executing instructions for the method stored in a non-transitory computer readable medium. Steps represented with broken lines can be omitted or are alternative steps for specific embodiment of the invention. Flow chart 200 starts with a step 201 of determining a sparsity distribution in a set of operand data. This step can be conducted in several ways as described before in this disclosure and as will be described in more detail below. For example, the determining of the sparsity distribution can be conducted by analyzing the operand data, as indicated in sub-step 202. This sub-step can include evaluating the set of operand data and measuring the sparsity distribution. The sparsity distribution can be a property of the set of operand data prior to the determining of the sparsity distribution. In the example of FIG. 1, for example, the determining of the sparsity distribution can include analyzing the set of operand data in matrices 130 and 140 and measuring the sparsity distribution. In embodiments where the sparsity distribution is a property of the set of operand data prior to the determining of the sparsity distribution, the measuring can include identifying the sparse values in the set, its distribution among the set of operand data, and its proportion to non-sparse values. Again, in the example of FIG. 1, this step could include identifying values E, and F, its distribution within matrices 130 and 140, and its proportion to the other values in the set.

As another example of step 201, the determining of the sparsity distribution can be conducted by altering the set of operand data, as indicated by sub-step 203 in flow chart 200. In this example, the sparsity distribution would be a property of the set of operand data produced by the determining of the sparsity distribution, in that sparsity can be enforced in certain portions of the operand data so that the sparsity distribution is induced by the determining step itself. In specific embodiments of the invention, the determining of the sparsity distribution can be conducted by generating a set of sparsity inducing commands to alter the set of operand data during execution of the set of instructions. In those embodiments, the sparsity distribution can be a property of the set of operand data produced during the execution of the set of instructions.

Various approaches for altering the operand data with the execution of step 203 are described throughout this disclosure. In specific embodiments of the invention, the altering step 203 includes randomly selecting, prior to executing the complex computation, data entries from the set of operand data to alter to a non-sparse value. In specific embodiments of the invention, the altering step 203 includes randomly selecting, while executing the complex computation, data entries from the set of operand data to alter to a non-sparse value. In specific embodiments of the invention, the altering step 203 includes obtaining an estimate of a computation using the execution data and altering, based on the estimate, the data entries from the set of operand data to alter to a non-sparse value. In those embodiments, the estimate of the computation can be obtained using the execution data.

The altering of the operand data in sub-step 203 can then be to increase a degree of sparsity in a sparsity distribution of a set of operand data for a complex computation. In this way, when the set of operand data is distributed to a set of processing cores for executing the complex computation, the altering sub-step 203 can balance the sparsity distribution among the set of processing cores. Referring back to the example of FIG. 1, if the sparsity distribution of the set of operand data in matrices 130 and 140 was unknown (i.e., not a property of the set of operand data prior to the determining of the sparsity distribution), sub-step 203 could be executed instead of sub-step 202 in order to carry out the determining step 201. In this way, the operand data could be altered (e.g., sparsity could be enforced for some values), so that the sparsity distribution among the cores 101-104 is balanced. For example, if the sparsity distribution of matrices 130 and 140 was unknown, sparsity could be enforced for selected values, for example values A and C could be set to non-sparse values so that values B and D are sparse in matrix 130, via step 203, so that each processing core receives an even amount of sparsity. If more values in the set are naturally sparse (not enforced) such as values E and F in FIG. 1, then more sparse values will be assigned to each processing core accordingly, but a certain degree of sparsity per core is already guaranteed by altering the operand data.

The systems and methods disclosed herein can balance the distribution of sparsity across a set of computational nodes in various ways. In particular, if the system knows which computational nodes will receive specific sets of operand data, sparsity can be enforced (for example, via step 203) upon those specific sets of operand data to create a balanced distribution of sparsity across the computational nodes. As another example, if the system knows a degree of sparsity of the set of operand data (for example, via step 202), the system can alter where the sets of operand data will be used in order to create a balanced distribution of sparsity across the computational nodes. These different approaches could also be used in combination in an iterative manner or according to an optimization algorithm that has different degrees of weight given to altering the operand data or altering where the data is utilized across the set of computational nodes. As with the determining of the sparsity distribution, the different approaches for distributing the sparsity across the set of computational nodes can be conducted in various times such as ex ante during a setup phase, such as the compilation of instructions for the execution of the complex computation by a set of computational nodes, or during runtime while the execution of the computation is taking place. In specific embodiments, regardless of which approach is utilized, the result will be that operand data is distributed to various computational nodes in a manner that balanced a distribution of sparsity of the operand data across the computational nodes.

Flow chart 200 further includes a step 204 of distributing the set of operand data, for example to a set of processing cores or other computational nodes. The set of operand data can be distributed for use in executing the complex computation. Step 204 can include programming a network for the distribution of the data, and the corresponding distribution via the network. As will be described in more detail in this disclosure, the set of operand data can include sparse values and non-sparse values and can be distributed to processing cores in a format which includes geometric information of such values, for example information provided by the non-sparse values of the operand data.

In specific embodiments of the invention, step 204 can be preceded by a step 205 of generating a set of instructions for executing the complex computation. The complex computation can be executed using a set of operand data and a set of processing cores as described before in this disclosure. The set of instructions can be generated by a dedicated module such as a compiler. In embodiments where step 205 is conducted, the distributing of the operand data in step 204 can be in accordance with the set of instructions generated in step 205. In those embodiments, the dedicated module (e.g., compiler) can be programmed to utilize the sparsity distribution in the set of operand data (for example the sparsity distribution determined in step 201), when generating the set of instructions in step 205, to balance the sparsity distribution among the set of processing cores.

In specific embodiments of the invention, the step 203 of altering the operand data is conducted prior to the step 205 of generating the set of instructions. In those embodiments, the instructions can be generated based on the altered operand data instead of the original operand data. In this way, sparsity that may have been induced in step 203 can be distributed among the cores by generating the set of instructions in step 205, to balance the sparsity distribution among the set of processing cores. In other specific embodiments of the invention, the step 203 of altering the operand data is conducted after assigning the set of instructions to the set of processing cores. In this way, the dedicated module that generates the instructions (e.g., compiler) can generate the set of instructions in step 205 and balance the sparsity distribution among the set of processing cores by subsequently altering the operand data so that sparsity is induced in step 203 and distributed along with the instructions among the cores. In specific embodiments of the invention, the generating of the set of instructions can include organizing the operand data into a set of blocks, where the set of blocks are a set of operands for the set of instructions, as will be described in more detail in this disclosure.

Figure 3:
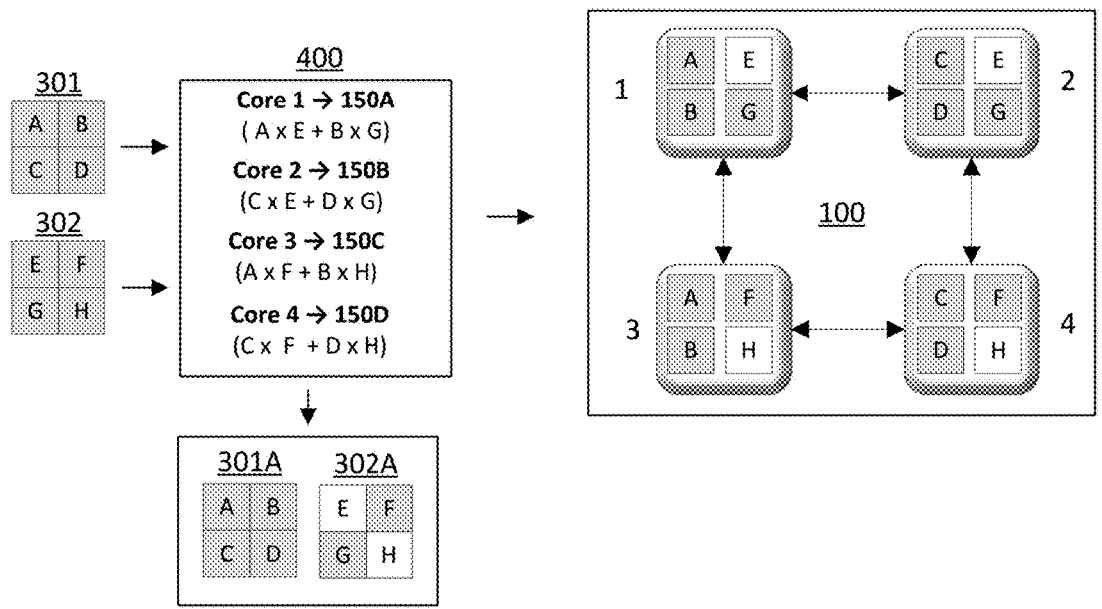
FIG. 3 illustrates two conceptual flow diagrams to illustrate different approaches for balancing a sparsity distribution of a set of operand data across a set of computational nodes in accordance with specific embodiments of the invention disclosed herein.
Figure 3:
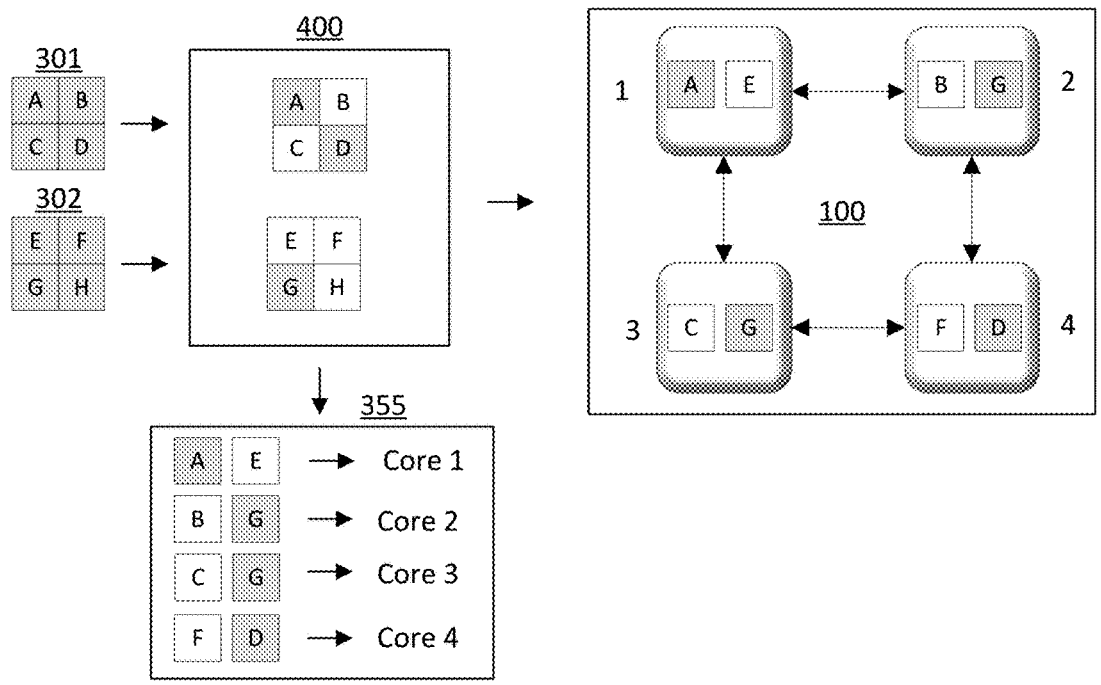

FIG. 3 illustrates two conceptual flow diagrams 300 and 350 to illustrate different approaches for balancing a sparsity distribution of a set of operand data across a set of computational nodes in accordance with specific embodiments of the invention disclosed herein. The conceptual flow diagrams illustrate potential embodiments involving steps 201 and 204 from FIG. 2 as well as additional embodiments. The conceptual flow diagrams are referenced in the following paragraphs to illustrate an example of two top level approaches for distributing sparsity. In both examples, the distribution of sparsity can be managed by a compiler 400 when generating instructions for the execution of the complex computation by a set of computational nodes, for example as indicated by step 205 of flow chart 200. However, as with the determining of the sparsity distribution, the distributing of the sparsity distribution can also be conducted by various systems, and a compiler is used in both examples to highlight the differences in the top-level approaches.

In specific embodiments of the invention, if the system knows which computational nodes specific sets of operand data will be distributed, the system can alter the operand data to assure that a distribution of sparsity is balanced across those computational nodes. This approach can be conducted based solely on the distribution of sparsity formed by that alteration (e.g., knowing that node 1 will get data set 1 and node 2 will get data set 2, then alter a set amount of operand data in data sets 1 and 2) or it could be conducted based on a known overall distribution of sparsity formed by the alteration (e.g., knowing that node 1 will get data set 1 and node 2 will get data set 2, then alter a customized amount of operand data in set 1 and another customized amount of operand data in set 2 such that data sets 1 and 2 have an equal amount of sparsity). These approaches can also be conducted ex ante during a setup phase or during execution of the complex computation. For example, if a compiler has generated placement instructions for specific operations to be conducted on specific computational nodes, the compiler can determine the sparsity of the operand data that is required for those specific operations and modify the data such that the various computational nodes receive data with an equal degree of sparsity. As another example, a computational node with multiple sets of data for downstream processing cores can determine the sparsity of the operand data that will be sent to those downstream computational nodes and modify the data such that the various downstream computational nodes receive data with an equal degree of sparsity. Alternatively, the computational node with multiple sets of data for downstream computational nodes could alter the operand data without analyzing it and create a sparsity distribution to be evenly balanced to the downstream computational nodes as they receive the data that is intended for them.

A non-limiting example of the embodiments described in the previous paragraph is illustrated in conceptual diagram 300. In this example, operand data sets 301 and 302 are used by a compiler 400 for execution of a complex computation which involves operations with data values A-H. In this example, the compiler 400 has generated placement instructions for specific component computations to be conducted on specific computational nodes. Taking as an example the component computations 150A-D of FIG. 1, the compiler 400 can have generated instructions so that instruction 150A (which involves operands A, E, B, G) is executed by core 1, instruction 150B (which involves operands C, E, D, G) is executed by core 2, instruction 150C (which involves operands A, F, B, H) is executed by core 3, and instruction 150C (which includes operands C, F, D, and H) is executed by core 4. Therefore, in this example, the compiler has prior knowledge of the data values that are going to be used by each computational node, but may or may not have previous knowledge of the sparsity distribution of the operand data 301 and 302. In order to balance the sparsity distribution among the computational nodes, the compiler 400 can perform step 203 of flow chart 200 and modify the operand data such that the various computational nodes receive data with a balanced degree of sparsity. An example of the altered operand data is illustrated in sets 301A and 302A. As represented with white boxes, sparsity has been enforced for data values E and H, which then results in an even degree of sparsity to be distributed for the computational nodes, as each computational node received either E or H as an operand. The distribution of sparsity in this example is facilitated by the knowledge of the distribution of instructions to the processing cores, in that the compiler can enforce sparsity on selected portions of the operand data to evenly distribute such sparsity among the processing cores. This is also an example of the embodiments where execution of step 205 precedes execution of step 203.

In specific embodiments of the invention, if the system has determined a distribution of sparsity for a set of operand data, the system can assign operations for the complex computation that utilize different portions of the set of operand data to different computational nodes to balance a distribution of the sparsity of the operand data among the set of computational nodes. These approaches can also be conducted ex ante during a setup phase or during execution of the complex computation. For example, a compiler could generate instructions for the execution of the complex computation and place specific instructions with specific computational nodes based on the sparsity of the operands for those specific instructions in order to balance the degree of sparsity across a set of computational nodes. As another example, in embodiments in which computational nodes can affect which downstream nodes execute specific instructions, a computational node with multiple sets of data for downstream processing cores can determine the sparsity of the operand data that will be sent to those downstream computational nodes and transmit overriding instructions to the downstream cores in order to balance a distribution of sparsity among the downstream computational nodes. As another example, the system can make informed judgements regarding which instructions will lead to inference dispositive results upfront and which instructions will lead to the generation of superfluous non-sparse data, and route instructions utilizing superfluous non-sparse data to specific processing cores in an effort to balance a distribution of sparsity in the system.

A non-limiting example of the embodiments described in the previous paragraph is illustrated in conceptual diagram 350. In this example, operand data sets 301 and 302 are provided to a compiler 400 for execution of a complex computation which involves operations with data values A-H. In this example, the compiler 400 has not yet generated placement instructions for the specific component computations to be conducted on specific computational nodes. Instead, the compiler 400 determines a degree of sparsity of the original set of operand data, for example by performing step 202 or 203 of flow chart 200. In this example, it is determined that the sparse values are A, D and G, as indicated by shaded boxes. In this way, the compiler can generate a set of instructions 355 which can assign operations for the complex computation that utilize different portions of the set of operand data to different computational nodes to balance a distribution of the sparsity of the operand data among the set of computational nodes. As illustrated in the example 350, each processing core receives an even distribution of sparsity by being assigned instructions which utilize such sparse values in a balanced manner.

In specific embodiments of the invention in which the operand data is altered, the operand data can be altered in various ways. The operand data can be altered randomly on a subset basis. For example, a fixed percentage of every hundred operand data values could be set to zero. As another example, two of every four operand data values could be set to zero. In each example, which values from among the subset were selected could be randomly selected. With respect to the context of ANNs, network data could be evaluated prior to execution in this manner to set a random portion of the network data to zero. With further respect to the context of ANNs, output data or execution data could be evaluated at runtime in this manner to set a random portion of the data for the next layer of the network to zero. These approaches can be beneficially applied to dense fully connected networks. Specific applications in which these approaches are particularly impactful include natural language processing (NLP) ANNs and ResNet ANNs. The selected portion could be changed with each execution of the network such that the values which were altered to zero were returned to their original values after each execution. The operand data could also be altered using an estimate of its importance which is obtained prior to execution. For example, operand data of a specific magnitude and above could remain unaltered while operand data below that magnitude was set to zero. With respect to the context of ANNs, network data could be evaluated prior to execution in this manner to set a portion of the network data to zero. The operand data could be altered using an estimate of its importance which is obtained during execution. For example, input or execution data could be applied to a "helper layer" of an ANN to provide an estimate of the impact a given input will have on the network and the output of the helper layer could be used to alter specific data values of the input or execution data to zero. The helper layer could operate on the input or execution data directly or a downsampled version of the input or execution data.

In specific embodiments of the invention, the operand data can be altered temporarily to simplify execution of a complex computation and then returned to its original value prior to alteration. Such an approach is illustrated by step 206 in FIG. 2 and the return arrow which circles back to step 201. For example, if the operand data were the network data of an ANN, the values of the network data that were altered in a step 203 could be retained while the associated computation was executed, so that the network data was not permanently changed. This approach could be used in a training phase of the ANN where each training iteration (i.e., application of a training input, evaluation of the output, and updating of the network data) is done with a subset of the network data that has not been randomly altered to zero and then concludes with the zeroed network data entries being return to their retained values. Such approaches have been found to mimic the performance of ensemble or mixture of experts training and inference approach as each approach effectively trains a slightly different network to cooperate on a complex computation.

In specific embodiments of the invention, the operand data is organized into blocks. The blocks can be used to reference a set of operand data when recalling the data from memory, transferring the operand data through a network, conducting a computation on the data, or storing the operand data back into memory. The blocks can include a set of data entries which can be individual elements of operand data. The data entries can be standard data types such as 8-bit integer, 16-bit floating point, or other data types. The blocks can be represented by labels in the instructions that will be executed by the computational nodes. For example, in the case of a multicore processor, the network routing instructions that transfer the blocks from one processor to another could use the same labels as the instructions executed by the computational pipelines of the processors. In keeping with the same example, the blocks could be the operands in instructions for matrix multiplication operations to be executed by a specific processing core.

The blocks can take on various sizes from application to application, and specific sets of computational nodes can use blocks of various sizes. For example, the blocks can be 16×16 data structures including 256 discrete data entries or 32×32 containing 1,024 discrete data entries. However, the blocks can also be large data structures comprising hundreds or thousands of individual data entries. In specific embodiments of the invention, the blocks will be smaller than the tensors in the application-level code of a complex computation. For example, if the application-level code for the execution of a CNN includes an operation which requires the convolution of a filter tensor with an input tensor, multiple blocks could be assigned to hold the data of the filter tensor. In specific embodiments of the invention, the blocks can be larger than a single data entry but smaller than a tensor identified in an operation at the application-level of the complex computation (e.g., a filter in a CNN or a layer in a fully connected ANN). Blocks of this size, when used to control the distribution of sparsity to a network of processing cores, provide significant benefits in that attempting to monitor and distribute sparsity at the level of individual data entries is generally not effective because the harm caused by the overhead associated with such a system is greater than the benefits associated with improved parallelization, while at the same time the blocks are small enough to allow multiple processing cores to cooperate in the execution of a given operation.

In specific embodiments of the invention, the blocks will be the units of record for keeping track of the distribution of sparsity among the various computational nodes. For example, the blocks can include headers which indicate a degree of sparsity, and the header can be accessed when determining which operations to assign to a given computational node. As another example, the blocks can be subjected to a fixed number of alterations towards sparsity (e.g., random zeroing of a fixed number of data entries) where the fixed number is set in proportion to the total number of entries in the block. In these examples, the blocks will necessarily exhibit a given degree of sparsity as the sparsity was forced upon the block without reference to the values of the block. As another example, the operand data can be analyzed and can be organized into blocks based on a desired level of sparsity per block. The organization process for putting the data into blocks could thereby take into account whether more sparsity was needed and increase the size of the data block in an effort to make them sparser through the inclusion of more non-sparse values. In accordance with these examples, the operand data can be organized into blocks before, after, or while determining the sparsity of the operand data in the block.

In specific embodiments of the invention, the distribution of sparsity can be orchestrated by a compiler. A compiler, which takes in an application-level description of the complex computation as a source language, and outputs a binary description of the complex computation in the form of a set of instructions for execution by each of the computational nodes as a target language, can have knowledge and control over which operations are conducted by which computational nodes. As such, the compiler can also have control over which operand data is sent to which computational node. Therefore, the compiler, if given the visibility into the values of the operand data, or the ability to alter the operand data to a known value, will be in an advantageous position to balance a distribution of sparsity across the set of processing cores. Examples of such approaches were given with reference to FIG. 3.

As used in the prior paragraph and in the remainder of this disclosure, the instructions for a complex computation described at an application level (e.g., source code) are referred to as "operations" while the lower-level instructions which use the instruction set of the computational nodes (e.g., the instruction set of a multicore processor) are referred to as "instructions." The operations can be defined with reference to application-level labels for large tensors and the instructions can be defined with reference to labels (e.g., binary codes) for subsets of the tensors (e.g., blocks). In specific embodiments of the invention, operations can serve as the complex computations described herein and multiple instructions can serve as component computations. The complex computation can be executed across multiple computational nodes with the required data being distributed between and operated upon in the form of the subsets of data such as the blocks disclosed herein.

In specific embodiments of the invention, the distribution of sparsity can be considered by a compiler at various stages of the compilation pipeline. For example, a compiler generating a set of instructions for executing a complex computation can take the sparsity of the operand data into account during a placement phase in which the compiler selects specific computational nodes to conduct specific operations. To the extent numerous threads of the complex computation are fungible at any given stage of the planned execution of the complex computation, the compiler could distribute threads to specific computational nodes based on the sparsity of the underlying operand data to assure that each computational node was given operand data with a balanced degree of sparsity. In keeping with this example, if the compiler would usually assign operation #1 to processing core #1 and operation #1 required two data structures A and B, the compiler can take the sparsity of data structures A and B into account when determining if the operation should be assigned to processing core #1, and could assign the operation to a different core based on the sparsity of the operand data in instructions that were already assigned to processing core #1. As another example, the compiler can take sparsity into account when breaking the operations of the source language into instructions for execution in the target language. The compiler could break the operations into instructions with different sized subsets of operand data (e.g., blocks) based on a detected or enforced degree of sparsity to assure that each of the various pieces had the same amount of sparsity. Alternatively, the compiler could break the operations into subsets of operand data and then ensure that the operand data was altered in such a way as to evenly distribute sparsity amongst the various subsets (e.g., altering a fixed number of entries in each block of operand data to zero).

In specific embodiments of the invention, balanced sparsity can be considered one constraint on the performance of a compiler used to generate instructions for the execution of a complex computation. A balanced distribution of sparsity could be given a weighting relative to other constraints such as placing an output computation of one layer on a computational node that is proximate the first computation of the next layer with sparsity allowing for those other constraints to not be as tightly met so long as sparsity was more evenly distributed. The constraint does not have to be absolute and can be set during compilation based on how well the other constraints of the compiler are met. The compiler could function to keep the distribution of sparsity low in the same way that traditional compilers treat constraints such as network bandwidth usage, optimal parallelization, and estimated overall time for computation.

Specific embodiments of the invention disclosed herein apply sparsity as one factor to take into consideration when distributing operand data to the various computational nodes of a network of computational nodes that will execute a complex computation. Accordingly, the system can distribute operand data in such a way as to balance a distribution of sparsity among the computational nodes of the system. However, as described, the sparsity of the operand data is not necessarily the only factor that is considered in assigning the computation to processing core #1. For example, the compiler may consider which operations can be conducted in parallel, the computational resources of the entire set of computational nodes, the size of the network and computation resources required for the component computation compared to the capabilities of the processing core #1, where the data for the computation will come from, where the output data will go to, the bandwidth of the network, and a multitude of other factors. As such, and as mentioned previously, as used herein the term "balance a distribution" of the sparsity refers to a flatting of a distribution of the sparsity, but does not refer to a perfectly even distribution, because optimizing solely for a perfectly even distribution would likely significantly disadvantage the overall performance of the device.

In specific embodiments, a distribution of sparsity can also be given variant degrees of weight relative to other factors. For example, sparsity can be balanced after the compiler has organized the data into blocks by evaluating the entries and altering them so that a fixed proportion of the entries in a subset of entries (e.g., each block) are set to a known non-sparse value (e.g., zeroing a fixed proportion of the data entries in each block). The resulting approach will tend to balance the distribution of sparsity through the computational nodes so long as the assignment of instructions assigns computations to specific computational nodes with similar sized subsets (e.g., blocks). This is advantageous in that such an approach is likely to produce similar workloads for the various computational nodes in the first place and so is unlikely to conflict with other constrains on the compiler.

Figure 4:
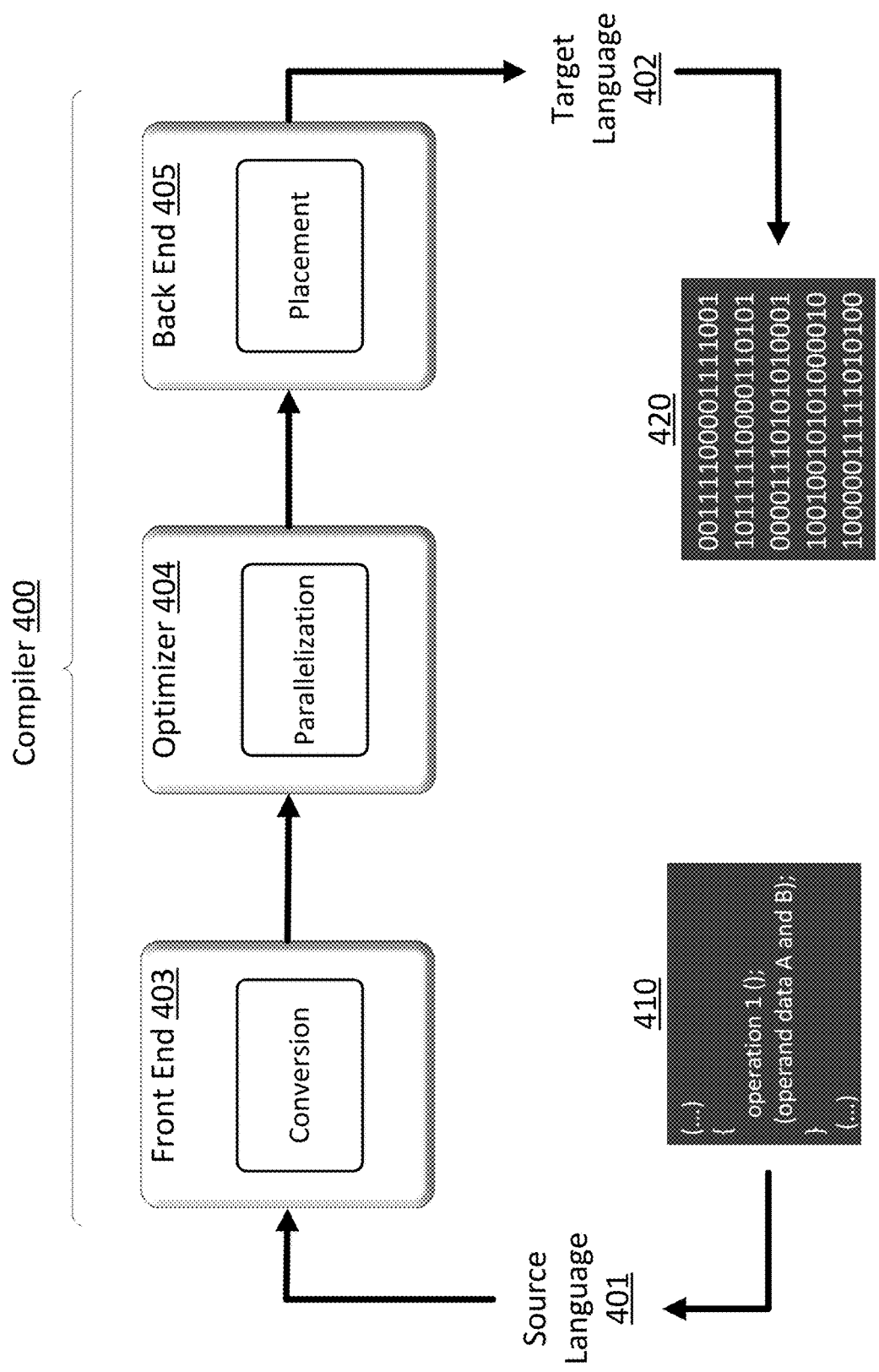
FIG. 4 illustrates a block diagram of a compiler, in accordance with specific embodiments of the present invention.

FIG. 4 includes a block diagram of a compiler, in accordance with specific embodiments of the present invention. Compiler 400 includes a front end 403 which can receive a source code language 401 description and convert it into an intermediate representation, for example for use by an optimizer 404. The optimizer 404 can receive the intermediate representation from the front end 403 and process it to parallelize the execution, converting the intermediate representation form the front end 403 into a different intermediate representation with specific format for usage by the back end 405. The back end 405 can receive the intermediate representation from the optimizer 404 and place instructions on specific hardware (e.g., computational nodes). The back end 405 can therefore be designed for a specific hardware implementation and can maximize the parallelization opportunities identified by optimizer 404 given the resource constraints of the specific hardware implementation.

As described before in this disclosure, the set of processing cores can be designed to operate with an instruction set. As illustrated in FIG. 4, the source language 401 of the compiler is source code 410, and the target language 402 of the compiler is the instructions set of the set of processing cores, which can be in the form of binary code 420. The compiler 400 can be programmed to utilize the sparsity distribution in various ways. For example, the source code description 410 of the complex computation can include one or more operations. The operations can require the execution of at least two instructions. The compiler can be programmed to utilize the sparsity distribution in the set of operand data when defining operands for the at least two instructions. The compiler can be programmed to utilize the sparsity distribution in the set of operand data when placing instructions from the set of instructions with processing cores in the set of processing cores. The compiler can be programmed to utilize the sparsity distribution in the set of operand data when the set of instructions are executed by the processing cores in the set of processing cores.

From the examples in the previous paragraph, it can be understood that sparsity can be taken into account in various places of the compiler pipeline as has been described through this disclosure. For example, sparsity can be considered first (e.g., by analyzing the operand data as in step 202) and then distributed during the parallelization/placement of the instructions by the optimizer 404/back end 405. As another example, the instructions can be generated first and sparsity can be enforced during placement of such instructions (e.g., by altering the operand data as in step 203). As another example, sparsity can be considered first and then during the formation of instructions from the operations, which can include the manner in which the compiler organizes data into specific blocks. As another example, instructions can be compiled to allow the computational nodes to act upon, and the data can be altered during execution.

In specific embodiments of the invention, the computational nodes will be able to control how they individually utilize sparsity to decrease computational resource consumption. For example, operations with non-sparse values could be suppressed entirely such that no corresponding data is moved within the execution area of the computational nodes, executed as lower fidelity versions, or could be replaced with the movement of a fixed value through the execution area without utilizing any multi-input computational resources (e.g., an arithmetic logic unit). In specific embodiments of the invention, although the distribution of sparsity is balanced across the processing cores for purposes of reducing computations, the operand data is still distributed in a format which provides information regarding the non-sparse data values. The operand data can be distributed in compressed or uncompressed form while still providing such information. Embodiments in accordance with this concept provide certain benefits in that the presence of non-sparse values can still provide geometric information in that they can define the relative locations of sparse values in a given data structure. As such, the operand data can be distributed in such a way as to preserve this information for usage by a given computational node. In specific embodiments, the format used for distribution of the operand data can be a compressed format such as compressed sparse row (CSR) format or the format specified in U.S. patent application Ser. No. 16/434,065 as filed on Jun. 6, 2019 and incorporated by reference herein in its entirety for all purposes.

Figure 5:
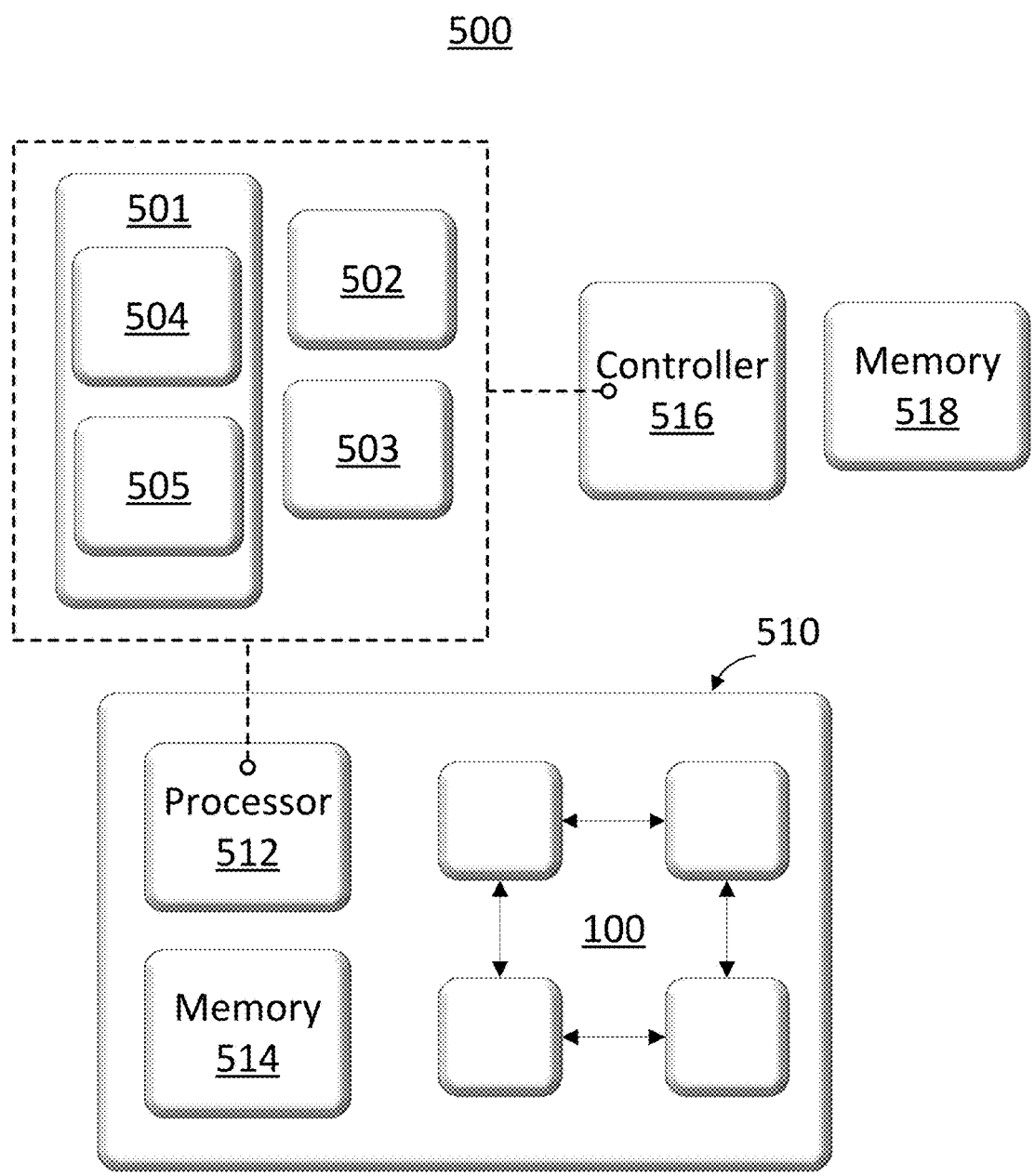
FIG. 5 illustrates an example of a system capable of performing the methods of FIG. 2, in accordance with specific embodiments of the present invention.

FIG. 5 includes an example of a system 500 capable of performing the embodiments described above in this disclosure. The system can include the means for performing the steps of the methods described with reference to FIG. 2.

System 500 includes a means for determining a sparsity distribution 501 in a set of operand data. The means for determining the sparsity distribution 501 can be a dedicated hardware module, such as a hardware module that includes a processing circuit working in association with a memory, executing instructions for performing step 201 of flow chart 200. The dedicated hardware module can include an entropy source which is used to randomly select data entries to change to a non-sparse values and circuitry for altering the data entries to such a non-spare value. The dedicated hardware module can alternatively include a comparator and a memory, or buffer, for evaluating entries and for storing a representation of their values. The means for determining the sparsity distribution 501 can be a dedicated software module, such as an instance of a program configured to perform step 201 of flow chart 200. In specific embodiments of the invention, the means for determining the sparsity distribution can be the compiler 400 described with reference to FIG. 4.

The means for determining a sparsity distribution 501 can further include a means for analyzing the operand data 504 and a means for altering a set of operand data 505 to increase a degree of sparsity in a sparsity distribution of the set of operand data. Both the means for analyzing the operand data 504 and the means for altering a set of operand data 505 can be dedicated hardware modules, such as hardware modules that include a processing circuit working in association with a memory, executing instructions for performing steps 202 and 203 of flow chart 200, respectively, or the hardware modules described in the prior paragraph. The means for analyzing the operand data 504 and the means for altering a set of operand data 505 can be dedicated software modules, such as instances of a program configured to perform steps 202 and 203 of flow chart 200, respectively. In specific embodiments of the invention, the means for analyzing the operand data 504 and the means for altering a set of operand data 505 can be the compiler 400 described with reference to FIG. 4. The means for determining a sparsity distribution 501, and/or any of the means for analyzing the operand data 504 and the means for altering a set of operand data 505 can be instantiated by one or more processors or controllers, wither internal or external to the system, as will be described below in more detail.

In specific embodiments of the invention, the means for determining a sparsity distribution 501, or any of the means for analyzing the operand data 504 and the means for altering a set of operand data 505 can be the computational nodes themselves, such as processing cores 100. In these embodiments, any of the steps such as the altering step 203 can be conducted on the set of processing cores. The altering step 203 can be based on the distributing of the set of operand data. The altering step 203 can be based on the distributing of the set of operand data in that the processing cores in the set of processing cores each can have a partial view of the distributing of the set of operand data. For example, each core can have knowledge of the cores it is sending data to, without having knowledge or control over the overall operand data for the complex computation.

System 500 includes a means for generating a set of instructions 502, for example instructions for executing a complex computation using a set of operand data and a set of processing cores 100. The means for generating a set of instructions can be a dedicated hardware module, such as a hardware module that includes a processing circuit working in association with a memory, executing instructions for performing step 205 of flow chart 200. The means for generating a set of instructions can be a dedicated software module, such as an instance of a program configured to perform step 205 of flow chart 200. In specific embodiments of the invention, the means for generating a set of instructions can be the compiler 400 described with reference to FIG. 4. The means for generating a set of instructions can utilize the sparsity distribution in the set of operand data, when generating the set of instructions, to balance the sparsity distribution among the set of processing cores, as described before with reference to step 205 in FIG. 2. In this way, when the means for generating a set of instructions is the compiler 400, the compiler can be further programmed to utilize the sparsity distribution in the set of operand data, when generating the set of instructions, to balance the sparsity distribution among the set of processing cores. The means for generating a set of instructions can be instantiated by one or more processors or controllers, either internal or external to the system, as will be described below in more detail.

System 500 includes a means for distributing the set of operand data 503 to the set of processing cores for use in executing the complex computation in accordance with the set of instructions. The means for distributing the set of operand data 503 can be a network programmed to distribute the operand data to the set of computational nodes. The means for distributing the set of operand data 503 can also include the compiler 400 described with reference to FIG. 4, in that the distribution network can be programmed by the compiler. The means for distributing the set of operand data 503 can be instantiated by one or more processors or controllers, either internal or external to the system, as will be described below in more detail. The means for distributing the data can be a controller or processor executing routing instructions as provided by a compiler where the routing instructions identify specific computational nodes for receiving the data via the network.

The system 500 can further include a set of computational nodes such as a set of processing cores 100. The system can include a substrate 510 for the set of processing cores. The substrate 510 can additionally include one or more processors 512. Each of the blocks 501-505 can be instantiated by the processor 512 on substrate 510. In specific embodiments of the invention, the compiler described with reference to FIG. 4 can be instantiated by the processor 512 on the substrate 510.

The system 500 further includes a memory 514, which can be a random access memory. Memory 514 can be a shared by the set of processing cores 100. In this way, the set of operand data can be distributed to the set of processing cores from the memory 514. Memory 514 can be on the substrate 510 or be an external memory. The system 500 can additionally or alternatively include external memory 518. The set of operand data can be distributed to the set of processing cores from the external memory 518.

The system 500 can include one or more controllers 516. The controller 516 can be an external controller. Each of the blocks 501-505 can be instantiated by the controller 516 and the controller 516 can be programed for performing any of the steps of method 200. In specific embodiment of the invention, the compiler 400 described in FIG. 4 is instantiated by the controller 516. In specific embodiments of the invention, the one or more controller 516 can include or work in association with one or more controllers of the system. For example, the controller can include a set of local controllers on the set of processing cores in a one-to-one correspondence. In those embodiments, the set of local controllers can be programed to alter the set of operand data to increase the degree of sparsity during execution of the complex computation. In this way, sparsity can be enforced by the controllers of the processing cores themselves once they receive the instructions and operand data to be operated on, instead of the compiler or any other means in the system.

The processors disclosed herein can take on various forms. The processors can be processing cores in a multicore processor or standalone processors. The processors can be implemented as single chip systems, including wafer-scale single chip systems, multichip single package systems, or in a multichip multipackage system in which the chips are commonly attached to a common substrate such as a printed circuit board (PCB), interposer, or silicon mesh. The processor can be part of a network of processors. The network can be a network on chip (NoC). The processors in accordance with this disclosure can also be part of a network that includes chips on multiple substrates linked together by a higher-level common substrate such as in the case of multiple PCBs each with a set of chips where the multiple PCBs are fixed to a common backplane. Processors in accordance with this disclosure can also be implemented in chiplet based systems. For example, in specific embodiments of the invention, one or more processors could be housed or implemented by one or more networked chiplets, connected, for example, through an interposer.

Although the specific examples provided in this section are directed to a network of computational nodes in the form of a NoC connecting a set of processing cores in a multicore processor, the approaches disclosed herein are broadly applicable to networks of any form of computational nodes. Furthermore, networks in accordance with this disclosure can be implemented on a single chip system, including wafer-scale single chip systems, in a multichip single package system, or in a multichip multipackage system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. Networks in accordance with this disclosure can also be implemented in chiplet based systems. For example, in specific embodiments of the invention, one or more computational nodes could be housed or implemented by one or more chiplets, connected, for example, through an interposer.

A processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a DDR DRAM. The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

While the example of a distribution of sparsity is used as an example throughout this disclosure, specific embodiments of the invention disclosed herein are more broadly applicable to the distribution of operand data for a complex computation to various computational nodes in any manner that favors an even decrease in a variance of the computational loads placed on the various computational nodes. For example, if a set of computational nodes was designed to round values that were close to zero down to zero, and skip computations involving a zero, the distribution of operand data could be conducted so that there was an even distribution of operand data below the value at which the rounding was conducted. As another example, if a set of computational nodes was designed to operate with a set of operand data organized into blocks or tiles with metadata associated with the blocks or tiles stored in association with the operand data, where the metadata indicated a degree by which the operations associated with the operand data could be suppressed, an evaluation of the metadata could be a factor in determining how the data could be distributed amongst the computational nodes.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A computer-implemented method comprising:
   determining a sparsity distribution in a set of operand data;
   generating, using a compiler, a set of instructions for executing, using the set of operand data and a set of processing cores, a complex computation; and
   distributing the set of operand data to the set of processing cores for use in executing the complex computation in accordance with the set of instructions;
   wherein the compiler is programmed to utilize the sparsity distribution in the set of operand data, when generating the set of instructions, to balance the sparsity distribution among the set of processing cores.

2. The computer-implemented method of claim 1, wherein:
   the determining of the sparsity distribution is conducted by evaluating the set of operand data and measuring the sparsity distribution; and
   the sparsity distribution is a property of the set of operand data prior to the determining of the sparsity distribution.

3. The computer-implemented method of claim 1, wherein:
   the determining of the sparsity distribution is conducted by altering the set of operand data; and
   the sparsity distribution is a property of the set of operand data produced by the determining of the sparsity distribution.

4. The computer-implemented method of claim 1, wherein:
   the determining of the sparsity distribution is conducted by generating a set of sparsity inducing commands to alter the set of operand data during execution of the set of instructions; and
   the sparsity distribution is a property of the set of operand data produced during the execution of the set of instructions.

5. The computer-implemented method of claim 1, wherein:
   the set of processing cores are designed to operate with an instruction set;
   a target language of the compiler is the instruction set; and
   a source language of the compiler is source code.

6. The computer-implemented method of claim 5, wherein:
   a source code description of the complex computation includes an operation;
   at least two instructions in the set of instructions are required to execute the operation; and
   the compiler is programmed to utilize the sparsity distribution in the set of operand data when defining operands for the at least two instructions.

7. The computer-implemented method of claim 1, wherein:
   the compiler is programmed to utilize the sparsity distribution in the set of operand data when placing instructions from the set of instructions with processing cores in the set of processing cores.

8. The computer-implemented method of claim 1, wherein:
   the compiler is programmed to utilize the sparsity distribution in the set of operand data when the set of instructions are executed by the processing cores in the set of processing cores.

9. The computer-implemented method of claim 1, wherein:
   the complex computation is an execution of an artificial neural network;
   the set of operand data includes network data and execution data; and
   the compiler is programmed to utilize the sparsity distribution in the network data and execution data, when generating the set of instructions, to balance the sparsity distribution among the set of processing cores.

10. The computer-implemented method of claim 1, wherein:
    the complex computation is an execution of an artificial neural network;
    the set of operand data includes network data;
    the determining of the sparsity distribution is conducted by altering the set of operand data; and
    the sparsity distribution is a property of the set of operand data produced by the determining of the sparsity distribution.

11. The computer-implemented method of claim 1, wherein:
    the complex computation is an execution of an artificial neural network;
    the set of operand data includes network data and execution data;
    the determining of the sparsity distribution is conducted by generating a set of sparsity inducing commands to alter the set of operand data during execution of the set of instructions; and
    the sparsity distribution is a property of the network data and execution data produced by the determining of the sparsity distribution.

12. The computer-implemented method of claim 1, wherein:
    the set of operand data is distributed to the processing cores in the set of processing cores in a format which includes geometric information provided by non-sparse values of the set of operand data.

13. The computer-implemented method of claim 1, wherein:

the generating of the set of instructions includes organize the operand data in the set of operand data into a set of blocks; and the set of blocks are a set of operands for the set of instructions.

14. The computer-implemented method of claim 13, wherein:

the complex computation is an operation on a first tensor and a second tensor;

at least two instructions in the set of instructions are required to execute the operation;

the blocks in the set of blocks are each larger than a single data entry; and the blocks in the set of blocks are each smaller than the first tensor and the second tensor.

15. The computer-implemented method of claim 13, wherein:

the determining of the sparsity distribution is conducted by altering the set of operand data so that the sparsity distribution is applied evenly across the set of blocks.

16. A system comprising:

a set of processing cores;

a compiler programmed to: (i) determine a sparsity distribution for of a set of operand data; and (ii) generate a set of instructions for executing a complex computation using the set of operand data and the set of processing cores; and a network programmed to distribute the set of operand data to the set of processing cores for use in executing the complex computation in accordance with the set of instructions;

wherein the compiler is further programmed to utilize the sparsity distribution in the set of operand data, when generating the set of instructions, to balance the sparsity distribution among the set of processing cores.

17. The system of claim 16, further comprising:

a substrate for the set of processing cores;

wherein the network is programmed by the compiler; and wherein the compiler is instantiated by a processor on the substrate.

18. The system of claim 16, further comprising:

a random access memory shared by the set of processing cores;

wherein the network distributes the set of operand data to the set of processing cores from the random access memory.

19. The system of claim 16, further comprising:

an external memory; and an external controller;

wherein the compiler is instantiated by the external controller; and wherein the network distributes the set of operand data to the set of processing cores from the external memory.

20. A system comprising:

a means for determining a sparsity distribution in a set of operand data;

a means for generating a set of instructions for executing a complex computation using the set of operand data and a set of processing cores; and a means for distributing the set of operand data to the set of processing cores for use in executing the complex computation in accordance with the set of instructions;

wherein the means for generating utilizes the sparsity distribution in the set of operand data, when generating the set of instructions, to balance the sparsity distribution among the set of processing cores.

* * * * *